M. E. SKERRITT.

Car-Step.

No. 9,263. Reissued June 22, 1880.

*Witnesses:*

Edwin G. Day

C. J. Mattison.

*Inventor:*

M. E. SKERRITT, by

William H. Low.

*Attorney.*

N. PETERS, PHOTO-LITHOGRAPHER, WASHINGTON, D. C.

UNITED STATES PATENT OFFICE.

MARGARET E. SKERRITT, OF ALBANY, NEW YORK.

CAR-STEP.

SPECIFICATION forming part of Reissued Letters Patent No. 9,263, dated June 22, 1880.

Original No. 221,111, dated October 28, 1879. Application for reissue filed April 5, 1880.

*To all whom it may concern:*

Be it known that I, MARGARET E. SKERRITT, of the city and county of Albany, and State of New York, have invented a new and useful Improvement in Steps for Railway-Cars, of which the following is a full and exact description, reference being had to the accompanying drawings, making a part of this specification, in which—

Figure 1:
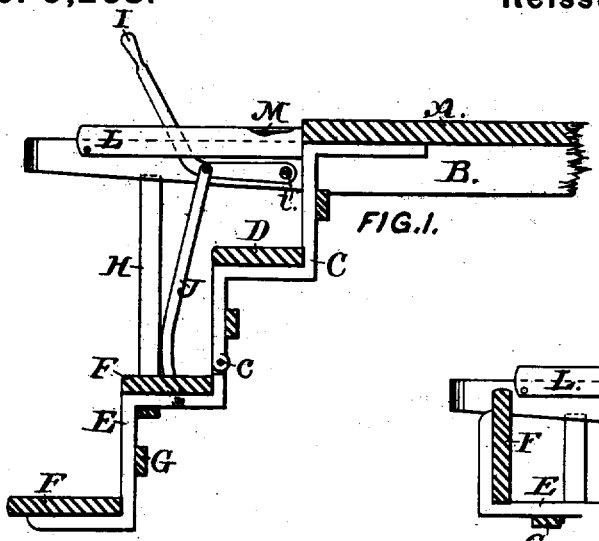
Figure 2:
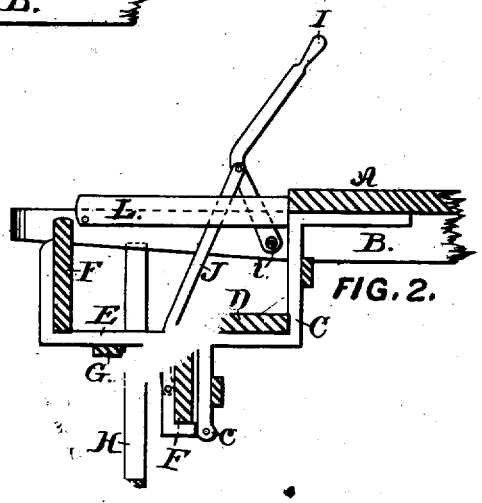
Figure 3:
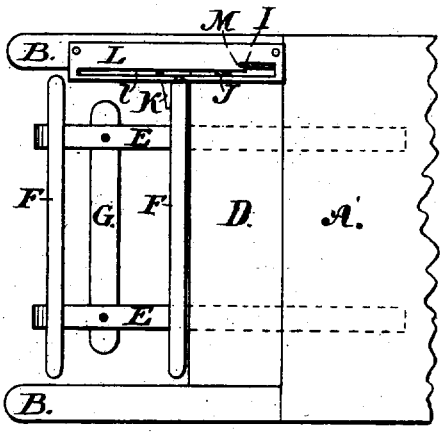
Figure 4:
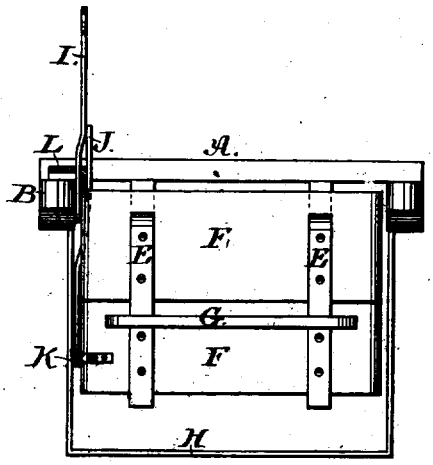

Figure 1 is a transverse section of a portion of a car-platform with my improved steps extended; Fig. 2, the same with the steps turned up; Fig. 3, a plan view of Fig. 2, and Fig. 4 a side elevation of the same.

The objects of my invention are, first, to afford to passengers better facilities for ascending and descending to and from the cars than are found in the car-steps generally used, and in which the lower step is fixed at such an inordinate height that it is always a source of inconvenience and frequently one of great danger; secondly, to provide a barrier to prevent the dangerous practice of jumping on or off the train while it is in motion; thirdly, to utilize the steps for forming a safety-pocket for catching persons who may accidentally fall from the platform; and, fourthly, to preserve the steps in a more cleanly and safe condition by preventing the deposition thereon of either cinders, snow, or ice; and to effect the objects named my invention consists in constructing each set of car-steps in two sections, the upper one of which is rigidly fixed to the platform of the car, and the lower section is hinged to the upper one in such manner that when extended the two sections form a continuous flight of steps; and my invention also consists in combining with said step-sections the mechanism and appliances for operating and supporting them hereinafter described.

As illustrated in the drawings, A represents the platform supported by the frame-work B of the car. To the under side of the platform there are rigidly secured the string-pieces C, which are bent into the proper form, as shown, for receiving one or more steps, D, and these parts constitute the upper or stationary section of my improved car-steps. The lower ends of the string-pieces C are provided with the joints *c*, to which are hinged the string-pieces E of the lower section of steps. These latter string-pieces are bent to receive one or more steps, F, and guards G. The three parts last named constitute the lower section of the steps, which is adapted to swing on the joints *c* as a pivotal center upward into the position shown in Fig. 2, or to turn downward, as shown in Fig. 1. When turned down the lower section is supported by the yoke H, which is secured to the platform-frame B, and, extending downward and crosswise, forms a bearing-bar on which the string-pieces E rest, as shown in Fig. 1.

A hand-lever, I, is pivoted at *i* to the platform-frame B, and is connected, by means of the rod or pitman J, to the stud K, secured to one of the steps F of the lower section. Said hand-lever projects far enough above the platform to be within convenient reach of the brakeman or other person whose duty it may be to attend to the operation of raising and lowering the steps. A plate, L, is secured to the frame-work B, and is provided with a slotted opening, *l*, through which the lever I passes. The said opening terminates in a notch, M, into which the lever I engages to securely lock the lower section of steps in place when turned up, as shown in Fig. 2. When locked by the means described the lower section is secured against any accidental releasement.

The operation of my invention is as follows: When the cars are at a station the lever I is released from the notch M, and the lower section is turned down, thereby bringing the lower step F within such a convenient stepping distance from the ground that any one, however old or infirm, can reach it without effort. On or before leaving the station the lever I is turned back to raise and lock the lower section of steps into the position shown in Fig. 2. By so doing the lower section is raised, so as to be out of danger of being injured by coming in contact with any obstruction on the road, and the steps F are thrown into a vertical position, where they form an effectual barrier for preventing people from indulging in the dangerous practice of jumping on or off of a train while it is in motion—a practice that sacrifices the lives of hundreds of people every year; and the position of said steps likewise prevents the lodgment thereon of cinders, snow, or ice. When the lower section is turned up the lower step is brought to such a height that it forms, with the lower guard G, string-pieces C and E, and stationary step D, a safety-pocket for catching persons that may accidentally fall from the platform.

Among the advantages that will be found in my invention, aside from the convenience, cleanliness, and safety hereinbefore set forth, are that by its means the ingress to each car may be limited to one place, thereby permitting a closer scrutiny of the passengers and a more thorough inspection of their tickets, and by it passengers may be prevented from leaving the cars from the side next to an adjoining track on which another train is about passing, and in this manner many fatal accidents may be averted.

Having thus described my invention, what I claim as new, and desire to secure by Letters Patent, is—

1. In railway-car steps, the improvement herein described, consisting in constructing the flight of steps in two sections, the upper section being immovably secured to the platform of the car, and the lower section being hinged to the upper section, as herein set forth, and adapted to operate by the mechanism described, in the manner and for the purpose specified.

2. The combination, with the platform A and stationary step or steps D, of the hinged steps F and the lever I, arranged for moving the said hinged steps to extend downward as a means of ingress and egress, or to raise said steps to form a barrier and safety-pocket, as and for the purposes specified.

3. The combination, with the hinged steps F, of the yoke H, adapted to support the said hinged steps while turned down, essentially as herein specified.

4. The combination, in railway-car steps constructed with an immovable upper section and a hinged lower section, as herein described, of the lever I and connecting-rod J, with the hinged section of steps F, substantially as specified.

5. The combination, with the plate L, provided with the slotted opening *l* and notch M, of the lever I, connected to the hinged section of steps F, as described, and adapted to engage in the notch M to lock the said hinged section in place, as herein specified.

MARGARET E. SKERRITT.

Witnesses:

S. L. SKERRITT,

WILLIAM H. LOW.